(12) United States Patent
Magnani

(10) Patent No.: US 11,368,646 B1
(45) Date of Patent: Jun. 21, 2022

(54) PER-COLOR ADAPTIVE IN-PIXEL PROGRAMMABLE GAIN AMPLIFICATION FOR HIGH DYNAMIC RANGE IN CMOS IMAGE SENSORS

(71) Applicant: SHENZHEN GOODIX TECHNOLOGY CO., LTD., Shenzhen (CN)

(72) Inventor: Alberto Mark Magnani, San Diego, CA (US)

(73) Assignee: Shenzhen Goodix Technology Co., Ltd., Shenzhen (CN)

( * ) Notice: Subject to any disclaimer, the term of this patent is extended or adjusted under 35 U.S.C. 154(b) by 0 days.

(21) Appl. No.: 17/395,425

(22) Filed: Aug. 5, 2021

(51) Int. Cl.
*H04N 5/3745* (2011.01)
*H04N 9/04* (2006.01)

(52) U.S. Cl.
CPC ..... *H04N 5/37457* (2013.01); *H04N 5/37455* (2013.01); *H04N 9/0455* (2018.08)

(58) Field of Classification Search
None
See application file for complete search history.

(56) References Cited

U.S. PATENT DOCUMENTS

| | | | |
|---|---|---|---|
| 2005/0168602 A1* | 8/2005 | Sumi | H04N 5/37455 348/E3.018 |
| 2016/0118424 A1* | 4/2016 | Guidash | H01L 27/14641 257/231 |
| 2017/0195596 A1* | 7/2017 | Vogelsang | H04N 5/343 |
| 2021/0037201 A1* | 2/2021 | Tantawy | H04N 5/378 |

* cited by examiner

*Primary Examiner* — Mark T Monk
(74) *Attorney, Agent, or Firm* — Kilpatrick Townsend & Stockton LLP

(57) ABSTRACT

Techniques are described for per-color adaptive in-pixel programmable gain amplification (PGA) for CMOS image sensors. The sensor has an array of photodetectors that each receives light through a corresponding color filter of a color filter array. Different color filters can have different transmissivity characteristics. Embodiments receive analog pixel output signals from the array of pixels. A respective gain select signal can be generated based on the signal level of each received analog pixel output signal to indicate a selected one of multiple gain factors. A programmable gain amplifier can be controlled, based on each respective gain select signal, to amplify the corresponding analog pixel output signal in accordance with the selected one of the predetermined plurality of gain factors, thereby generating a respective adaptively amplified pixel output signal. The adaptively amplified pixel output signal can be output to an analog-to-digital conversion path for generation of a digital pixel output signal.

18 Claims, 4 Drawing Sheets

PER-COLOR ADAPTIVE IN-PIXEL PROGRAMMABLE GAIN AMPLIFICATION FOR HIGH DYNAMIC RANGE IN CMOS IMAGE SENSORS

TECHNICAL FIELD

This disclosure relates to digital imaging systems, and, more particularly, to per-color adaptive in-pixel programmable gain amplification (PGA) for high dynamic range (HDR) in complementary metal-oxide semiconductor (CMOS) image sensors, such as for smart phone cameras and/or other digital cameras.

BACKGROUND

Many electronic devices include digital imaging systems. For example, most modern smartphones include one or more digital cameras. Modern image sensors with high pixel counts (e.g., 48-Megapixel sensors, or the like) attempt to achieve high frame rate, low read noise, high dynamic range and/or other features with minimal power consumption (e.g., for longer battery life, less heating, etc.). The basic function of a modern CMOS image sensor (CIS) is to capture photons that are converted into electrons in a photodetector (e.g., a photodiode). These captured electrons are read out by a series of analog-to-digital converters (ADCs) included as part of the sensor.

Such CMOS image sensors tend to have difficulty operating well in low-light conditions for several reasons. One reason is that detection of multiple colors by the CIS tends to involve covering the photodetectors with a color filter array (CFA), which is an array of color filters arranged in a particular pattern. While the CFA allows the CIS to differentiate a scene in color, the color filters, by their very nature, reduce the number of photons collected by the photodetectors. Another reason CMOS image sensors tend to have difficulty operating well in low-light conditions is that many modern applications seek ever-increasing numbers of pixels in small sensor footprints, continually driving down pixel sizes. With smaller pixels, however, fewer photons per pixel tend to reach the active photodiode area to generate electron-hole pairs. In low-light conditions, there can already be a relatively small number of photons to collect. As such, further reductions of photon collection due to filtering by the CFA, shrinking pixel sizes, and/or other factors can result in a very low signal level. In some cases, the signal level is too low to support reliable reconstruction of imaging information, such as too low to reliably distinguish from noise.

Various conventional approaches are used to improve low-light performance. One example of a conventional approach is to increase power in the readout chain, which can tend to provide lower read noise and/or higher dynamic range, thereby improving image quality. However, higher power consumption also reduces battery lifetimes, increases thermal heating, and may have other undesirable consequences for sensor performance specifically, and/or consumer product implementations more generally. Another example of a conventional approach is to use pixel binning to combine outputs of multiple photodetectors in each color plane to effectively increase the signal level for each color plane. While such pixel binning can increase readout speed and reduce noise without an increase in power consumption, there is an appreciable trade-off in reduced sensor resolution. Thus, conventional CIS designs continue to struggle to achieve high performance in low-light conditions, while maintaining other features, such as high resolution, fast readout, low noise, and low power consumption.

SUMMARY

Embodiments provide systems and methods for per-color adaptive in-pixel programmable gain amplification (PGA) for high dynamic range (HDR) in CMOS image sensors. The image sensor has an array of pixels, each having a photodetector that receives light through a corresponding color filter of a color filter array (CFA). Different color filters in the CFA can have different transmissivity characteristics. Embodiments receive analog pixel output signals from the array of pixels, each corresponding to a light level detected by a single pixel or a binned set of pixels. A respective gain select signal can be generated based on the signal level of each received analog pixel output signal, such that the respective gain select signal indicates a selected one of multiple gain factors. A programmable gain amplifier can be controlled, based on each respective gain select signal, to amplify the corresponding analog pixel output signal in accordance with the selected one of the predetermined plurality of gain factors, thereby generating a respective adaptively amplified pixel output signal. The adaptively amplified pixel output signal can be output to an analog-to-digital conversion path for generation of a digital pixel output signal.

BRIEF DESCRIPTION OF THE DRAWINGS

The accompanying drawings, referred to herein and constituting a part hereof, illustrate embodiments of the disclosure. The drawings together with the description serve to explain the principles of the invention.

In the appended figures, similar components and/or features can have the same reference label. Further, various components of the same type can be distinguished by following the reference label by a second label that distinguishes among the similar components. If only the first reference label is used in the specification, the description is applicable to any one of the similar components having the same first reference label irrespective of the second reference label.

DETAILED DESCRIPTION

In the following description, numerous specific details are provided for a thorough understanding of the present invention. However, it should be appreciated by those of skill in the art that the present invention may be realized without one or more of these details. In other examples, features and techniques known in the art will not be described for purposes of brevity.

Figure 1:
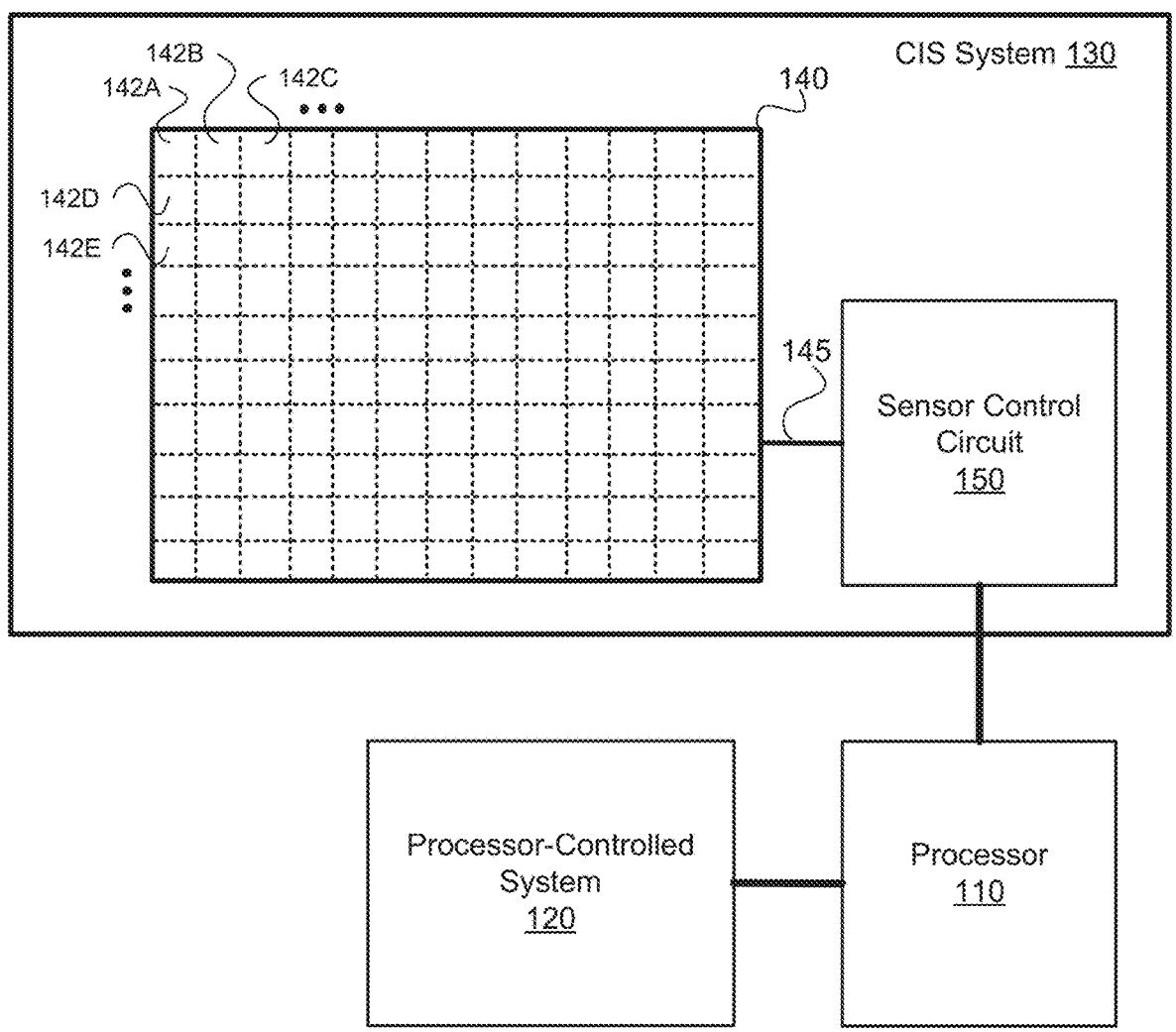
FIG. 1 shows a block diagram of an imaging sensor environment as context for various embodiments described herein.

Turning to FIG. 1, a block diagram is shown of an imaging sensor environment 100 as context for various embodiments described herein. The imaging sensor environment 100 is illustrated as including a processor 110 in communication with a processor-controlled system 120 and a complementary metal-oxide semiconductor (CMOS) imaging sensor (CIS) system 130. The imaging sensor environment 100 may be used to implement a digital imaging system in any suitable application context. For example, the processor 110, processor-controlled system 120, and CIS system 130 can all be implemented in a smartphone, digital camera, wearable device, implantable device, laptop computer, tablet computer, electronic reader, Internet of things (IoT) appliance, or any other suitable context.

The processor-controlled system 120 is intended generally to represent any suitable system or systems to provide any suitable features of the imaging sensor environment 100, other than those of the CIS system 130. For example, in a smart phone, the processor-controlled system 120 can include subsystems for providing telephonic and communications features, display features, user interaction features, application processing features, etc. Embodiments of the imaging sensor environment 100 can include one or more processors 110. In some embodiments, the one or more processors 110 are shared between the processor-controlled system 120 and the CIS system 130. In other embodiments, one or more processors 110 are used by the processor-controlled system 120, and the CIS system 130 has its own one or more dedicated processors 110. For example, one or more dedicates processors of the CIS system 130 can include any suitable processors and/or circuits for directing operation of the sensor array 140, processing signals received from the sensor array 140, and interfacing with other systems (e.g., processor 110). Some implementations are implemented as, or include a companion integrated circuit (IC) having integrated interface components, storage components, and processing components. For example, the processing components of the sensor control circuit 150 and/or on-board processors of the sensor array 140 can include one or more central processing units (CPUs), application-specific integrated circuits (ASICs), application-specific instruction-set processors (ASIPs), graphics processing units (GPUs), physics processing units (PPUs), digital signal processors (DSPs), field-programmable gate array (FPGAs), programmable logic devices (PLDs), controllers, microcontroller units, reduced instruction set computer (RISC) processors, complex instruction set computer (CISC) processors, microprocessors, or the like, or any combination thereof.

Embodiments of the CIS system 130 include a sensor array 140 and a sensor control circuit 150. As described below, the sensor array 140 and sensor control circuit 150 can communicate via an interface channel 145. The sensor array 140 can be implemented as an array of photodetector elements 142, which can be implemented by any suitable photosensitive component or group of components. In some cases, the sensor array 140 is a high-pixel-count array, such as a 48 Megapixel array. In some implementations, each photodetector element 142 can include a photodiode and a filter that is configured to detect light energy in one or more frequency bands. The photodetector elements 142 can implement a color filter array (CFA), such that the sensor array 140 can detect light energy in at least the range of colors of the visible spectrum and can output corresponding electrical signals.

In some implementations, the CFA can be a conventional RGB (or RGGB) CFA, such as arranged in a Bayer pattern. In other implementations, the CFA can be a RYYB CFA, or other CFA that tends to use yellow (Y) color filters for increased transmissivity. In other implementations, the CFA is designed as a red-green-blue-white (RGBW) CFA. Such a RGBW CFA includes red, green, and blue (RGB) pixels with white (W) pixels (also referred to as "luminance pixels") interspersed. In some such RGBW CFAs, the W pixels are evenly interspersed with the RGB pixels with approximately fifty-percent density.

A basic function of a modern complementary metal-oxide semiconductor (CMOS) image sensor (CIS) is to capture photons that are converted into electrons in a photodetector (e.g., a photodiode). These captured electrons are read out by a series of analog-to-digital converters (ADCs) included as part of the sensor. For example, though not explicitly shown, the sensor array 140 also includes readout circuitry. The readout circuitry can generally include readout lines to selectively feed analog output signals from the photodetector elements 142 to analog-to-digital converters (ADCs), which can convert the analog output signals to digital output signals for output over the interface channel 145 to the sensor control circuit 150.

Such CMOS image sensors tend to have difficulty operating well in low-light conditions for several reasons, including that detection of multiple colors by the sensor array 140 tends to involve covering the photodetectors with the CFA. While the array of color filters of the CFA allow the sensor array 140 to differentiate a scene in color, the color filters, by their very nature, reduce the number of photons collected by the photodetector elements 142. In low-light conditions, there can already be a relatively small number of photons to collect. Further reductions of photon collection due to filtering by the CFA, and/or other factors can result in a very low signal level. In some cases, the signal level is too low to support reliable reconstruction of imaging information, such as too low to reliably distinguish signals from noise.

Some conventional CIS implementations use high-gain amplifiers to improve low-light performance by reducing noise in low-light conditions. However, applying high gain in high-light conditions can cause undesirable effects, such that uniform application of high-gain amplification over the entire detection array in all light conditions can tend to reduce overall dynamic range of the CIS. Some modern CIS implementations can uniformly apply high-gain amplification across the entire detection array, but only in low light conditions. Such approaches can tend to improve dynamic range of the CIS, particularly in context of commonly used red-green-blue (RGB) image sensor arrays, in which there is a relatively low variation in transmissivity among the different colors of the array.

Embodiments described herein include techniques for adapting in-pixel programmable gain amplification (PGA) on a per-pixel-color-intensity basis to achieve high dynamic range (HDR) in the CIS system 130. As noted above, elements of the CFA tend to reduce the number of photons (i.e., the amount of light) reaching the photodetector elements 142 of the sensor array 140. The amount of filtering can vary based on an actual color filter spectral response, so that different filter colors tend to manifest different transmissivity. Embodiments consider the level of light intensity reaching the photodetector elements 142 after the color filter array (CFA) elements to determine which of multiple levels of gain (e.g., high-gain, mid-gain, low-gain, etc.) to apply on a per-pixel and/or per-color basis. For example, each pixel (e.g., each photodetector element 142 and respective CFA element) is associated with its own dynamically programmable gain based on its CFA color and intensity. Alternatively, neighboring pixels of a same color can be binned together to form a binned pixel set, and each binned pixel set is associated with its own dynamically programmable gain based on its CFA color and intensity. With each pixel within a frame having its own dynamic PGA, an overall dynamic range for the entire frame (i.e., over the entire sensor array 140) can be extended.

Figure 2:
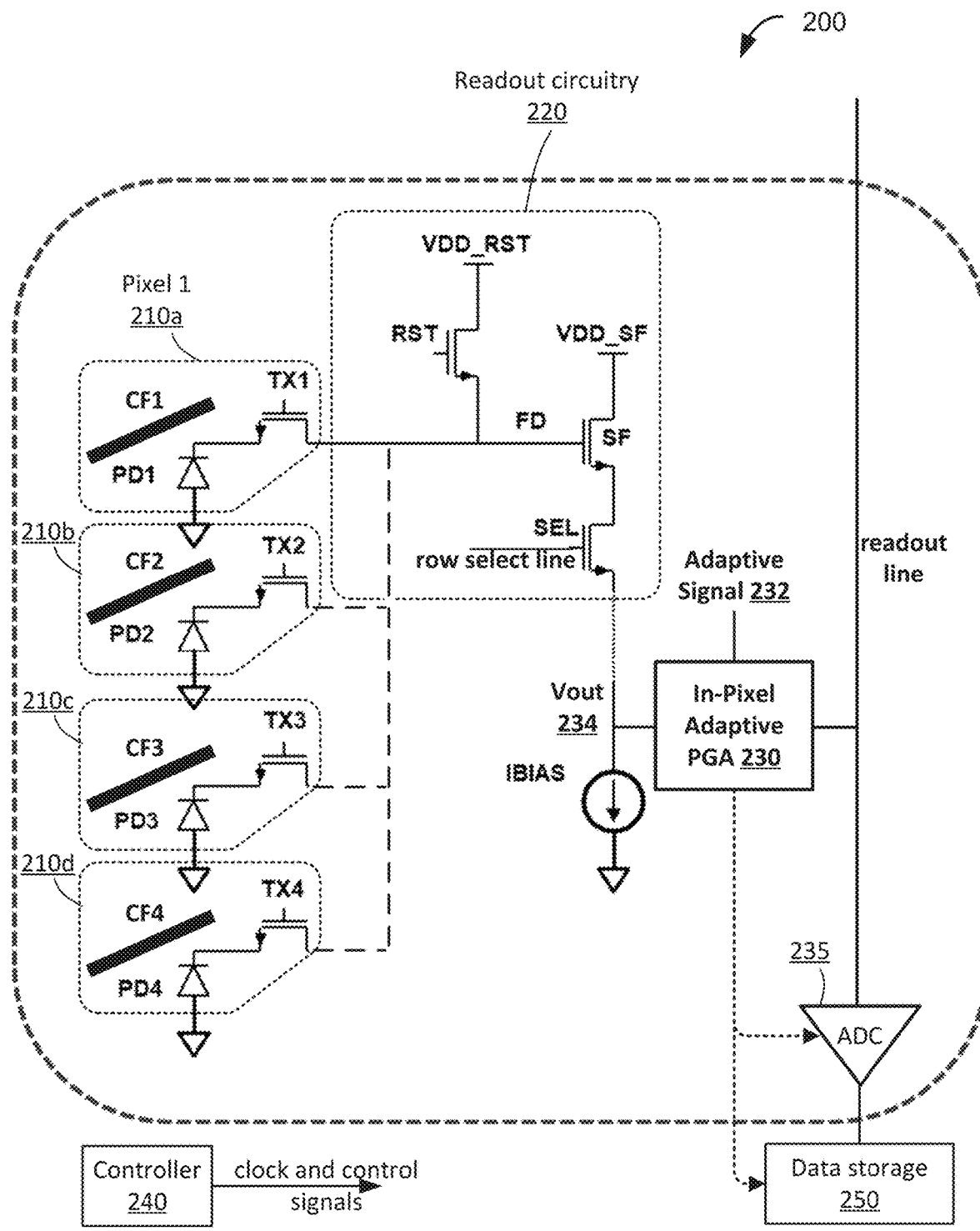
FIG. 2 shows a simplified schematic diagram of a portion of an example image sensor having pixel-adaptive PGA, according to various embodiments described herein.

For the sake of illustration, FIG. 2 shows a simplified schematic diagram 200 of a portion of an example image sensor having pixel-adaptive PGA, according to various embodiments described herein. The illustrated portion of the image sensor can be an implementation of the sensor array 140 of FIG. 1. As illustrated, the portion of the image sensor can include pixels 210, readout circuitry 220, an in-pixel adaptive PGA 230, and an analog-to-digital converter (ADC) 235. Each pixel 210 is illustrated to include a color filter (CF), a photosensitive element (PD), and a transfer transistor (TX). Each CF is an element of a CFA disposed on top of the PDs. As such, the color of each CF is based on the CFA pattern, and each CF can be configured only to allow a particular range of frequencies of illumination to reach its corresponding PD. For example, the CF can be transmissive to a range of frequencies corresponding to a particular color, such as red, green, blue, yellow, etc. In some cases, the color filter is a luminance filter, which effectively forms a white pixel.

Each TX is coupled between a corresponding PD and a floating diffusion node (FD) of the readout circuitry 220. The readout circuitry 220 includes a reset transistor (RST) having a drain node coupled with a reset voltage reference (VDD_RST), a source node coupled with FD (i.e., with the TXs), and a gate node controlled by a reset signal (RST). RST is configured to charge FD to VDD_RST when RST is turned ON, thereby resetting FD. Each PD may be reset along with FD by turning on its corresponding TX (e.g., by asserting or de-asserting a TXn control signal). The readout circuitry 220 also includes a source follower transistor (SF) having a drain node coupled with a source follower voltage reference (VDD_SF), a gate node coupled with FD (i.e., with the TXs), and a source node coupled with a drain node of a row select transistor (SEL). SEL has a gate node coupled to a row select line and a source node coupled with a current source (IBIAS). A voltage signal at the source node of SEL is an analog output pixel signal (Vout) 234 representing the amount of light detected by the pixel(s) 210. In the illustrated implementation, TX, RST, SF, and SEL are NMOS transistors. Alternative implementations can be designed using PMOS transistors, and/or other suitable components.

As shown, embodiments can include a controller to generate clock and control signals. The controller can be implemented using any suitable hardware, firmware, etc. In some implementations, the controller is integrated with the sensor array as an on-sensor component (e.g., as part of sensor array 140). In other implementations, the controller is implemented by a separate controller or processor as an off-sensor component (e.g., by the sensor control circuit 150). In other implementations, features of the controller are distributed between one or more on-sensor components and one or more off-sensor components. For example, the sensor control circuit 150 (off-sensor) can generate commands that direct timing and/or generation of particular control signals by an on-sensor controller. In some embodiments, the controller can include processing circuitry, logic state machines, phase locked loops, and/or the like to provide clock and control signals to the image sensor.

Some implementations can include only a single pixel 210*a*, such that Vout 234 is generated as the analog output value of the pixel 210*a*. In other implementations, multiple pixels 210 are binned together using a charge-binning approach, in which charges of multiple pixels 210 (e.g., corresponding to the amount of light, number of photons, etc. detected by the pixels) are added, averaged, or otherwise combined onto the readout line at one or multiple levels. The illustrated portion of the array is shown with four pixels 210 that can be binned together, but other implementations can apply charge-binning to any suitable number of pixels. As illustrated, each pixel 210 (e.g., a pixel 210 on each row or each column) has its own TX. TXn control signals can be generated by the controller 240 with particular timing to support binning. For the sake of illustration, the schematic diagram 200 can be used to implement readout without binning by using a single TX (e.g., TX1) to turn ON a single PD (e.g., PD1), thereby individually transferring charge from the single PD to FD (e.g., RST is turned on prior to turning on the TX to reset FD to VDD_RST). The charge on FD is then transferred via SF and SEL, such that Vout 234 represents the amount of light detected by the single pixel 210. Similarly, the schematic diagram 200 can be used to implement readout with binning by controlling multiple TXs (e.g., TX1-TX4) concurrently to turn ON all their respective PDs (e.g., PD1-PD4), thereby collectively transferring charge from multiple PDs to FD (e.g., RST is turned on prior to turning on the TXs to reset FD to VDD_RST). The combined charge now on FD is then transferred via SF and SEL, such that Vout 234 represents the amount of light detected by the binned pixel set. Different binning schemes can be supported, based on which pixels share a common FD, how many pixels share a common FD, capabilities of the controller, etc.

As illustrated, the Vout signal 234 can be passed to the in-pixel adaptive PGA 230. As noted above, each CF can manifest a particular color filter spectral response, resulting in a certain amount of transmissivity. For example, even if neighboring red and green pixels 210 are exposed to the same brightness of white light (presumably having equal amounts of red and green light components), those pixels 210 may still output different analog signal levels because of the difference in transmissivity of their respective CFs. The in-pixel adaptive PGA 230 receives the Vout signal 234 for a particular pixel 210 or binned pixel set (e.g., pixels 210*a*-210*d*), as well as one or more adaptive signals 232 indicating the level of light intensity reaching the one or more pixels 210. For example, the adaptive signals 232 may be generated based on neighboring white (luminance) pixels, and/or in other suitable manners. The in-pixel adaptive PGA 230 automatically and adaptively applies an amount of gain to the Vout signal 234 based on the detected pixel color intensity to generate an adaptively amplified pixel output signal.

The adaptively amplified pixel output signal can be coupled with a readout line, which passed the adaptively amplified pixel output signal to the ADC 235 for conversion into a digital pixel output signal. In some embodiments, data storage 250 is configured to store the digital pixel output signal after pixel conversion by the ADC 235. In some implementations, the data storage 250 includes buffers and/or registers for temporarily storing readout data prior to transmission of the data to other processing components (e.g., prior to transmission to the sensor control circuit 150 over the interface channel 145). For example, readout data is buffered in the data storage 250 for fast, serialized transmission to the sensor control circuit 150.

In effect, the in-pixel adaptive PGA 230 seeks to dynamically adjust the amount of gain applied to pixels 210 based on the light condition being experienced by each pixel 210 or binned pixel set (i.e., increasing the gain for pixels 210 experiencing lower light conditions) and on the transmissivity of the pixel 210 or binned pixel set (i.e., further increasing the gain for pixels 210 having less transmissive color filters). By dynamically adjusting the gain on such a per-pixel-color-intensity basis, the signal-to-noise ratio can be increased across the sensor array 140. However, applying different amounts of gain to different portions of the sensor array 140 can also result in an inaccurate representation of the actual color intensities being imaged. For example, because the in-pixel adaptive PGAs 230 will tend to add more gain in darker regions of a scene and less gain in lighter areas of a scene, the generated adaptively amplified pixel output signals can represent an appreciably smaller range of brightness levels across the scene than what may actually be the case. As such, embodiments of the in-pixel adaptive PGA 230 can provide for renormalization of the pixel outputs so as to more faithfully represent the range of brightness levels of a scene being imaged.

In some embodiments, the in-pixel adaptive PGA 230 provide for such renormalization by indicating to the ADC 235 an applied gain factor, indicating which level of gain was applied to the raw analog pixel output signal (Vout) to generate the adaptively amplified pixel output signal. In such embodiments, the ADC can then adjust the digital pixel output signal based on the applied gain factor, thereby generating a renormalized digital pixel output signal. The renormalized digital pixel output signal can be stored in the data storage 250. In other embodiments, the in-pixel adaptive PGA 230 can pass the applied gain factor to the data storage 250 for storage in association with the converted digital pixel output signal from the ADC 235. For example, each digital pixel output signal is output based on a full dynamic range value (e.g., all ADC 235 are implemented with larger bit depth, resulting in a digital pixel output signal represented by a larger number of bits), and the value indicated by the digital pixel output signal is stored by the data storage 250 in association with the applied gain factor used by the in-pixel adaptive PGA 230 to generate the adaptively amplified pixel output signal that was converted into the digital pixel output signal. In embodiments where the illustrated partial image sensor is implemented for a single pixel 210 (i.e., without any charge-binning), each pixel 210 can be associated with a respective instance of at least the readout circuitry 220 and in-pixel adaptive PGA 230. In embodiments where the illustrated partial image sensor is implemented for groups of pixels 210 (i.e., with charge-binning), each group of pixels 210 (each binned pixel set) can be associated with a respective instance of at least the readout circuitry 220 and in-pixel adaptive PGA 230.

Figure 3:
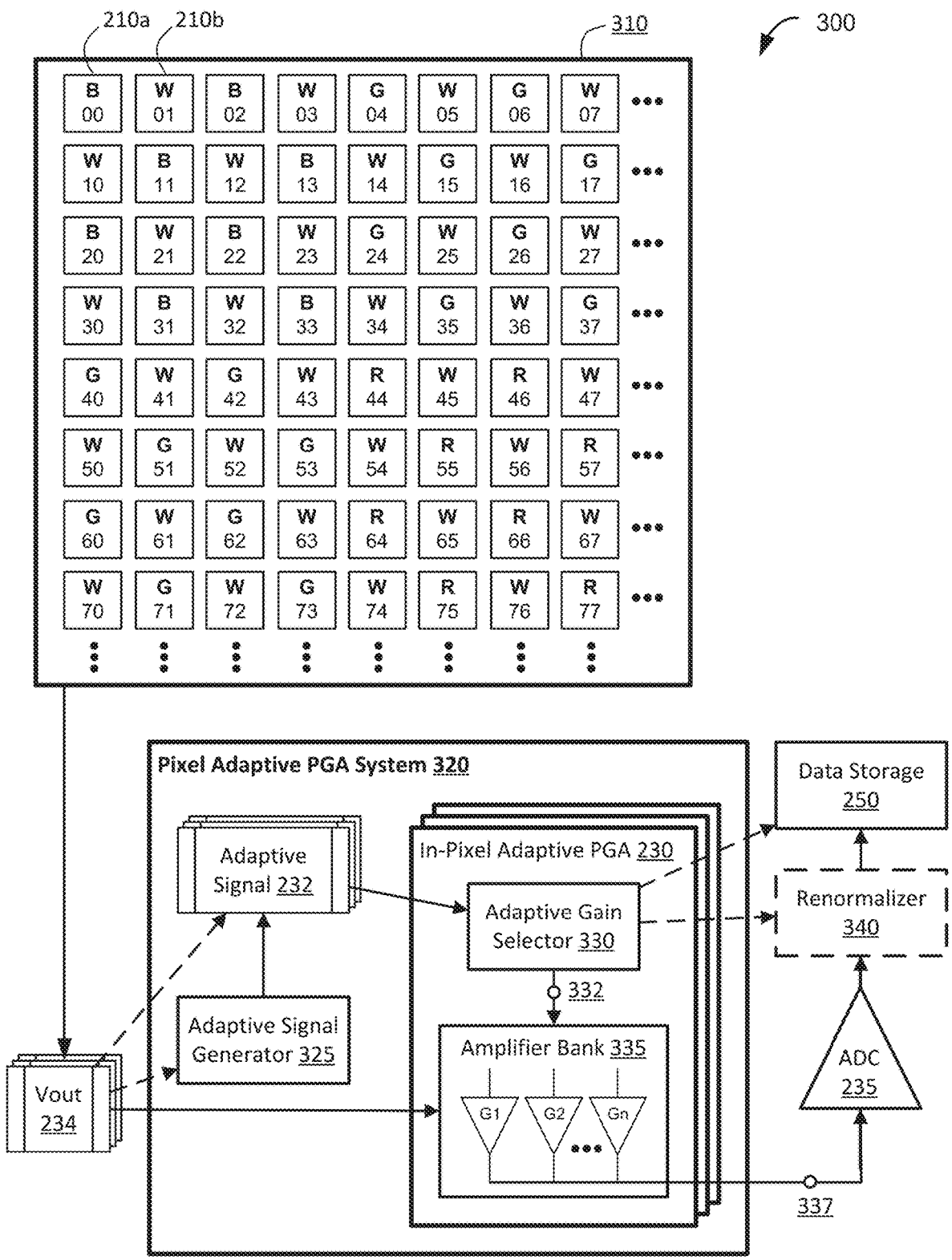
FIG. 3 shows an illustrative imaging system including a pixel-adaptive PGA system, according to various embodiments described herein.

FIG. 3 shows an illustrative imaging system 300 including a pixel-adaptive PGA system 320, according to various embodiments described herein. The system can be implemented in context of a CIS system, such as the CIS system 130 of FIG. 1. The pixel-adaptive PGA system 320 can include multiple instances of in-pixel adaptive PGAs 230, such as those described with reference to FIG. 2. The pixel-adaptive PGA system 320 is coupled with a sensor array 310, which is an array of pixels 210 with a CFA disposed thereon (not explicitly shown). As noted above, different color filters in the CFA can have different transmissivity characteristics. For example, white (W) pixels tend to be the most transmissive, followed by yellow (Y) pixels, then green (G) pixels, then red (R) and blue (B) pixels. As such, while embodiments described herein can work with any CFA, they tend to be particularly useful in context of CFAs that manifest relatively large differences in transmissivity across the different color filters. For example, many conventional CFAs are designed according to a Bayer-type pattern, typically using R, G, and B pixels (e.g., in an RGGB pattern); and the different color filters of such CFAs often tend to have relatively similar transmissivity characteristics. Some other conventional CFA designs use yellow (Y) pixels, such as in a RYYB pattern, or the like, and the transmissivity of the Y pixels may be appreciably different from that of the R and B pixels. Some recent developments in CIS technology have introduced RGBW CFAs, which can include non-Bayer patterns having W pixels evenly interspersed among blocks of the RGB pixels. In a RGBW CFA, the W pixels can have a much larger transmissivity than that of its neighboring R, G, and B pixels.

Purely for the sake of illustration, a portion of the sensor array 310 is illustrated in accordance with a corresponding portion of an illustrative RGBW CFA. The illustrated RGBW CFA includes an 8-by-8 array of pixels 210. Each location in the sensor array 310 alternates between an RGB pixel and a W pixel, such that the W pixels are evenly interspersed among the RGB pixels (i.e., the sensor array 310 can have approximately fifty percent W pixels, and approximately fifty percent RGB pixels). The illustrated portion can be implemented as a quadrant of a larger 16-by-16 array, and may be one block of a much larger sensor array 310, such as the sensor array 140 of FIG. 1. For example, the sensor array 310 may include millions of total pixels implemented as thousands of instances of the illustrated RGBW CFA pattern. Each pixel 210 is labeled with a color (R, G, B, or W) and a number representing its position in the illustrated portion of the sensor array 310. For example, pixel 210a is labeled "B 00," indicating that pixel 210a has a blue color filter and is located in the (0, 0) position of the sensor array 310.

The pixel-adaptive PGA system 320 can include multiple instances of the in-pixel adaptive PGA 230 of FIG. 2. As described with reference to FIG. 2, some embodiments implement a respective instance of the in-pixel adaptive PGA 230 for each set of pixels 210. In some embodiments, the set of pixels 210 is a single pixel 210, such that the pixel-adaptive PGA system 320 implements a respective instance of the in-pixel adaptive PGA 230 for each pixel 210. In such embodiments, the sensor array 310 can output a respective Vout signal 234 for each pixel 210, and the Vout signal 234 can be passed to the pixel-adaptive PGA system 320. In other embodiments, the set of pixels 210 is a binned pixel set, such that the pixel-adaptive PGA system 320 implements a respective instance of the in-pixel adaptive PGA 230 for each binned pixel set. In such embodiments, the sensor array 310 can output a respective Vout signal 234 for each binned pixel set, and the Vout signal 234 can be passed to the pixel-adaptive PGA system 320. For example, binning is performed in any suitable manner under direction of the controller 240, and the generated Vout signals 234 each represent a charge-binned output from a respective binned pixel set. For the sake of illustration, referring to the illustrated partial sensor array 310, one implementation can generate a respective Vout signal 234 for each of the 64 pixels 210 in the partial sensor array 310 (i.e., 64 Vout signals 234, and 64 corresponding instances of the in-pixel adaptive PGA 230); another implementation can use diagonal binning to generate a respective Vout signal 234 for each of 32 binned pairs of pixels 210 (i.e., 32 Vout signals 234, and 32 corresponding instances of the in-pixel adaptive PGA 230); another implementation can bin all 8 B pixels for a one Vout signal 234, all 8 R pixels for another Vout signal 234, all 16 G pixels for another Vout signal 234, and all 32 W pixels for another Vout signal 234 (i.e., for 4 total Vout signals 234, and 4 corresponding instances of the in-pixel adaptive PGA 230); and another implementation can bin all 8 B pixels for a one Vout signal 234, all 8 R pixels for another Vout signal 234, each quadrant of 8 G pixels for two more Vout signals 234, and each quadrant of W pixels for four more Vout signals 234 (i.e., for 8 total Vout signals 234, and 8 corresponding instances of the in-pixel adaptive PGA 230).

Each instance of the in-pixel adaptive PGA 230 includes an adaptive gain selector 330 and an amplifier bank 335. The adaptive gain selector 330 generates a gain select signal 332 based on one or more adaptive signal 232 indicating the level of light intensity reaching the one or more pixels 210. The generated gain select signal 332 is then used to control the amplifier bank 335, effectively programming an amount of gain to be applied to the Vout signal 234. For example, responsive to the adaptive signal 232 indicating a low signal level associated with a particular Vout signal 234 (i.e., with a particular pixel 210 or binned pixel set), the adaptive gain selector 330 generates the gain select signal 332 to program the amplifier bank 335 to apply high-gain to the Vout signal 234; responsive to the adaptive signal 232 indicating a high signal level associated with a particular Vout signal 234, the adaptive gain selector 330 generates the gain select signal 332 to program the amplifier bank 335 to apply low-gain to the Vout signal 234.

In some embodiments, the Vout signal 234 for a particular pixel 210 (or binned pixel set) is used directly as the adaptive signal 232. For example, the adaptive gain selector 330 compares a received Vout signal 234 to one or more predetermined threshold levels (e.g., using a comparator circuit, or the like), and generates a gain select signal 332 based on the result of the comparison. In other embodiments, the pixel-adaptive PGA system 320 includes an adaptive signal generator 325 to generate one or more adaptive signal 232 from one or more local detected pixel signal levels. In one such embodiment, the adaptive signal generator 325 receives a Vout signal 234 and generates the adaptive signal 232 as a digital signal (i.e., representing a binary value, score, etc.) that represents one of a discrete set of selection options (e.g., one of N gain levels, where N is a positive integer greater than 1); the adaptive signal 232 is then passed to the adaptive gain selector 330 for use in generating the gain select signal 332. In another such embodiment, the adaptive signal generator 325 receives a Vout signal 234 and generates the adaptive signal 232 as an analog signal (e.g., a DC voltage level) that represents one of a discrete set of selection options; the adaptive signal 232 is then passed to the adaptive gain selector 330 for use in generating the gain select signal 332.

In some embodiments, the adaptive signal generator 325 can generate the adaptive signal 232 based on a first set of pixels 210 for use in selecting a gain factor for a second set of pixels, where the second set may not fully, or even partially, overlap with the first set. As one example, referring to the B pixels in the illustrated partial sensor array 310, the array 310 may output 8 individual Vout signals 234 for each B pixel; a single one of the Vout signals 234 is used to generate the adaptive signal 232 for selecting a gain factor, and the same selected gain factor is applied by the amplifier bank 335 to all 8 of the Vout signals 234 generated for the individual B pixels. As another example, referring again to the B pixels in the illustrated partial sensor array 310, the array 310 may output a first Vout signal 234 representing the combined (binned) output of all 8 B pixels, and a second Vout signal 234 representing the output of a single one of the B pixels; the first generated Vout signal 234 can be used as the Vout signal 234 that is passed to the amplifier bank 335 for amplification, and the second Vout signal 234 can be used as the adaptive signal 232 for selecting the gain factor to apply to the first Vout signal 234. Similarly, in context of imaging multiple frames in rapid succession (e.g., for video acquisition, or the like), adaptive signals 232 can be generated for one frame and can be used to select a gain factor to be consistently applied across the multiple frames in fast succession (e.g., within an acquisition window in which lighting conditions can be assumed to remain substantially stable).

As described above, the adaptive gain selector 330 generates a gain select signal 332 based on the adaptive signal 232, which is used to control a gain factor applied by the amplifier bank 335. Embodiments of the amplifier bank 335 can be implemented in any suitable manner to provide programmable gain. In some embodiments, the amplifier bank 335 is a set of two or more discrete amplifiers (e.g., operational amplifiers, or the like), each having a respective gain corresponding to one of the gain factors. In some such embodiments, the adaptive gain selector 330 is a multiplexer, a bank of switches, or any other suitable selection circuit. In one implementation, the Vout signal 234 is coupled with a signal input of the multiplexer, each of multiple selectable outputs of the multiplexer is coupled with a respective one of the amplifiers in the amplifier bank 335, and a selection input of the multiplexer is coupled with the adaptive signal 232. In such an implementation, the Vout signal 234 would be coupled with the adaptive gain selector 330 (as opposed to being coupled directly with the amplifier bank 335, as shown in FIG. 3), and the adaptive signal 232 would also be the gain select signal 332. In other embodiments, the amplifier bank 335 is an amplifier with multiple selectable gain paths, such as an operational amplifier circuit with multiple load (e.g., resistor) networks that can be optionally switched into, or out of, the circuit by a set of switches (e.g., transistors). In such embodiments, the set of switches is controlled by the gain select signal 332. Some embodiments of the amplifier bank 335 provide for two gain factors (e.g., high gain and low gain). Other embodiments of the amplifier bank 335 provide for three gain factors (e.g., high gain, medium gain, and low gain). Other embodiments of the amplifier bank 335 can provide for any suitable number of gain factors.

The output of the amplifier bank 335 (and of each instance of the in-pixel adaptive PGA 230) is an adaptively amplified pixel output signal 337. As described with reference to FIG. 2, the adaptively amplified pixel output signal 337 can be coupled with an ADC 235 (e.g., via a readout line) for conversion into a digital pixel output signal. In some embodiments, data storage 250 is configured to store the digital pixel output signal after pixel conversion by the ADC 235. As described above, embodiments can provide for renormalization of the pixel outputs so as to more faithfully represent the range of brightness levels of a scene being imaged. To that end, embodiments of the adaptive gain selector 330 can output a signal (e.g., the gain select signal 332) to indicate which gain factor is associated with each adaptively amplified pixel output signal 337 (i.e., which gain factor was applied by the amplifier bank 335 to the corresponding Vout signal 234 to generate the adaptively amplified pixel output signal 337. In some embodiments, the adaptive gain selector 330 communicates the signal to the renormalizer 340, and the renormalizer can adjust the digital pixel output signal based on the applied gain factor, thereby generating a renormalized digital pixel output signal (e.g., for storage in the data storage 250). In other embodiments, the adaptive gain selector 330 communicates the signal to the data storage 250 for storage in association with the converted digital pixel output signal from the ADC 235 (i.e., for later renormalization).

Figure 4:
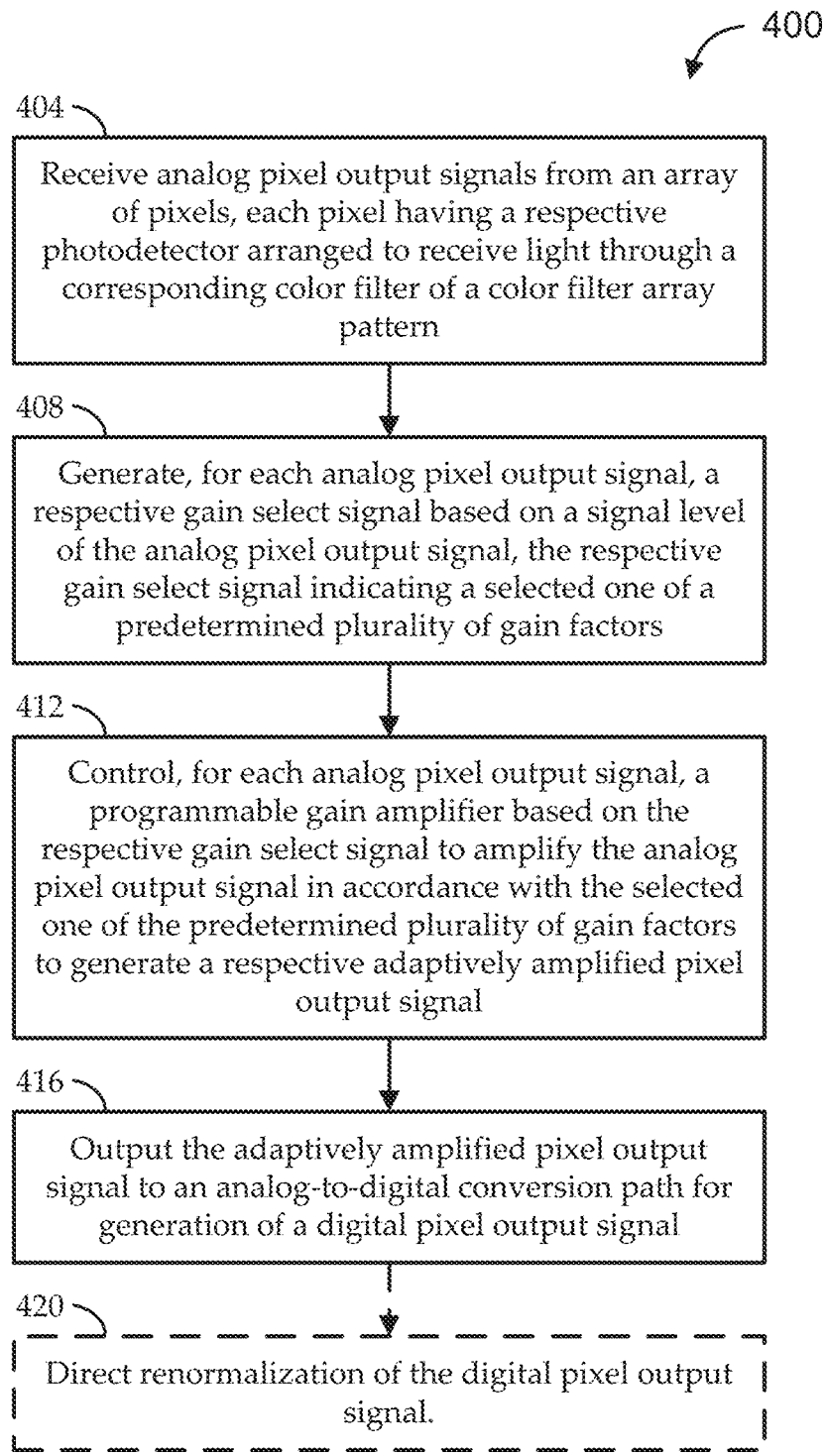
FIG. 4 shows a flow diagram of an illustrative method for per-color adaptive in-pixel programmable gain amplification (PGA) for high dynamic range (HDR) in CMOS image sensors, according to various embodiments.

FIG. 4 shows a flow diagram of an illustrative method 400 for adaptive programmable gain amplification in a complimentary metal-oxide semiconductor (CMOS) image sensor (CIS) system, according to various embodiments. Embodiments of the method 400 can begin at stage 404 by receiving analog pixel output signals (e.g., Vout signals 234) from an array of pixels. As described herein, each pixel has a respective photodetector arranged to receive light through a corresponding color filter of a color filter array (CFA) pattern. Different color filters can have different transmissivity characteristics. In some implementations, the CFA pattern is a RGBW color filter array pattern. In some other implementations, the CFA pattern forms white and/or yellow pixels (e.g., an RGBW pattern, a RYYB pattern, etc.). In some embodiments, each analog pixel output signal corresponds to an amount of light detected by the respective photodetector of a respective pixel of the array of pixels (i.e., to a single pixel output). In other embodiments, each analog pixel output signal corresponds to a combined amount of light detected by respective photodetectors of a respective binned set of pixels of the array of pixels, each binned set of pixels having a same color of corresponding color filters.

At stage 408, embodiments can generate, for each analog pixel output signal, a respective gain select signal based on a signal level of the analog pixel output signal. The respective gain select signal indicates a selected one of a predetermined plurality of gain factors. In some implementations, the predetermined plurality of gain factors includes a high-gain factor and a low-gain factor. In some implementations, the predetermined plurality of gain factors further includes a medium-gain factor, and/or any number of other gain factors. In some embodiments, generating the respective gain select signal at stage 408 for at least one of the analog pixel output signals includes generating an adaptive signal based on another of the analog pixel output signals, and generating the gain select signal based on the adaptive signal.

At stage 412, embodiments can control, for each analog pixel output signal, a programmable gain amplifier based on the respective gain select signal. Such controlling amplifies the analog pixel output signal in accordance with the selected one of the predetermined plurality of gain factors to generate a respective adaptively amplified pixel output signal. At stage 416, embodiments can output the adaptively amplified pixel output signal generated in stage 412 to an analog-to-digital conversion path for generation of a digital pixel output signal. Some embodiments can further include directing renormalization of the digital pixel output signals at stage 420. In some implementations, directing renormalization at stage 420 includes directing the analog-to-digital conversion path to renormalize the digital pixel output signal based on the selected one of the predetermined plurality of gain factors. In other implementations, directing renormalization at stage 420 includes outputting data indicating the selected one of the predetermined plurality of gain factors for storage in association with storing the digital pixel output signal in a data storage.

While this disclosure contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document.

A recitation of "a", "an" or "the" is intended to mean "one or more" unless specifically indicated to the contrary. Ranges may be expressed herein as from "about" one specified value, and/or to "about" another specified value. The term "about" is used herein to mean approximately, in the region of, roughly, or around. When the term "about" is used in conjunction with a numerical range, it modifies that range by extending the boundaries above and below the numerical values set forth. In general, the term "about" is used herein to modify a numerical value above and below the stated value by a variance of 10%. When such a range is expressed, another embodiment includes from the one specific value and/or to the other specified value. Similarly, when values are expressed as approximations, by use of the antecedent "about," it will be understood that the specified value forms another embodiment. It will be further understood that the endpoints of each of the ranges are included with the range.

All patents, patent applications, publications, and descriptions mentioned here are incorporated by reference in their entirety for all purposes. None is admitted to be prior art.

What is claimed is:

1. An in-pixel adaptive programmable gain amplification (PGA) system comprising:
 a plurality of instances of in-pixel adaptive PGA subsystems to couple with an array of pixels, each pixel having a respective photodetector arranged to receive light through a corresponding color filter of a color filter array pattern, each instance of the in-pixel adaptive PGA subsystem to receive a respective analog pixel output signal of a plurality of analog pixel output signals output by the array of pixels, each instance of the in-pixel adaptive PGA subsystem comprising:
  an adaptive gain selector to generate a respective gain select signal based on a signal level of the respective analog pixel output signal, the respective gain select signal indicating a selected one of a predetermined plurality of gain factors; and
  a programmable gain amplifier coupled with the adaptive gain selector to:

receive the respective gain select signal from the adaptive gain selector and to amplify the respective analog pixel output signal in accordance with the selected one of the predetermined plurality of gain factors indicated to generate a respective adaptively amplified pixel output signal; and output the adaptively amplified pixel output signal to an analog-to-digital conversion path for generation of a digital pixel output signal; and a data storage coupled with the analog-to-digital conversion path to receive and store each digital pixel output signal, and coupled with the adaptive gain selector of each instance of the in-pixel adaptive PGA subsystem to receive respective data indicating the selected one of the predetermined plurality of gain factors applied to the respective analog pixel output signal and to store the data in association with the digital pixel output signal.

2. The in-pixel adaptive PGA system of claim 1, further comprising:

the analog-to-digital conversion path, wherein the adaptive gain selector is further to direct the analog-to-digital conversion path to renormalize the digital pixel output signal based on the selected one of the predetermined plurality of gain factors.

3. The in-pixel adaptive PGA system of claim 1, wherein:

the programmable gain amplifier comprises a plurality of amplifiers, each having a gain corresponding to a respective one of the predetermined plurality of gain factors;

the adaptive gain selector comprises a multiplexer having a signal input coupled with the analog pixel output signal, a control input coupled with the gain select signal, and a plurality of selectable outputs each coupled with a respective one of the plurality of amplifiers.

4. The in-pixel adaptive PGA system of claim 1, wherein:

each instance of the in-pixel adaptive PGA subsystem further comprises an adaptive signal generator configured to generate a respective adaptive signal based on a local luminance level determined to be associated with the respective analog pixel output signal; and the adaptive gain selector is to generate the gain select signal based on the adaptive signal.

5. The in-pixel adaptive PGA system of claim 1, wherein each analog pixel output signal corresponds to an amount of light detected by the respective photodetector of a respective pixel of the array of pixels.

6. The in-pixel adaptive PGA system of claim 1, wherein each analog pixel output signal corresponds to a combined amount of light detected by respective photodetectors of a respective binned set of pixels of the array of pixels, each binned set of pixels having a same color of corresponding color filters.

7. The in-pixel adaptive PGA system of claim 1, wherein the color filter array pattern is a RGBW color filter array pattern.

8. The in-pixel adaptive PGA system of claim 1, wherein the color filter array pattern forms white and/or yellow pixels.

9. The in-pixel adaptive PGA system of claim 1, wherein the predetermined plurality of gain factors comprises at least three different gain factors.

10. A complimentary metal-oxide semiconductor (CMOS) image sensor (CIS) system comprising the in-pixel adaptive PGA system of claim 1.

11. A method for adaptive programmable gain amplification in a complimentary metal-oxide semiconductor (CMOS) image sensor (CIS) system, the method comprising:

receiving a plurality of analog pixel output signals from an array of pixels, each pixel having a respective photodetector arranged to receive light through a corresponding color filter of a color filter array pattern;

generating, for each analog pixel output signal, a respective gain select signal based on a signal level of the analog pixel output signal, the respective gain select signal indicating a selected one of a predetermined plurality of gain factors;

controlling, for each analog pixel output signal, a programmable gain amplifier based on the respective gain select signal to amplify the analog pixel output signal in accordance with the selected one of the predetermined plurality of gain factors to generate a respective adaptively amplified pixel output signal;

outputting the adaptively amplified pixel output signal to an analog-to-digital conversion path for generation of a digital pixel output signal; and outputting data indicating the selected one of the predetermined plurality of gain factors for storage in association with storing the digital pixel output signal in a data storage.

12. The method of claim 11, further comprising:

directing the analog-to-digital conversion path to renormalize the digital pixel output signal based on the selected one of the predetermined plurality of gain factors.

13. The method of claim 11, wherein:

generating the respective gain select signal for at least one of the analog pixel output signals comprises generating an adaptive signal based on another of the analog pixel output signals; and generating the gain select signal based on the adaptive signal.

14. The method of claim 11, wherein each analog pixel output signal corresponds to an amount of light detected by the respective photodetector of a respective pixel of the array of pixels.

15. The method of claim 11, wherein each analog pixel output signal corresponds to a combined amount of light detected by respective photodetectors of a respective binned set of pixels of the array of pixels, each binned set of pixels having a same color of corresponding color filters.

16. The method of claim 11, wherein the color filter array pattern is a RGBW color filter array pattern.

17. The method of claim 11, wherein the color filter array pattern forms white and/or yellow pixels.

18. The method of claim 11, wherein the predetermined plurality of gain factors comprises at least three different gain factors.

* * * * *